Patented Apr. 24, 1934

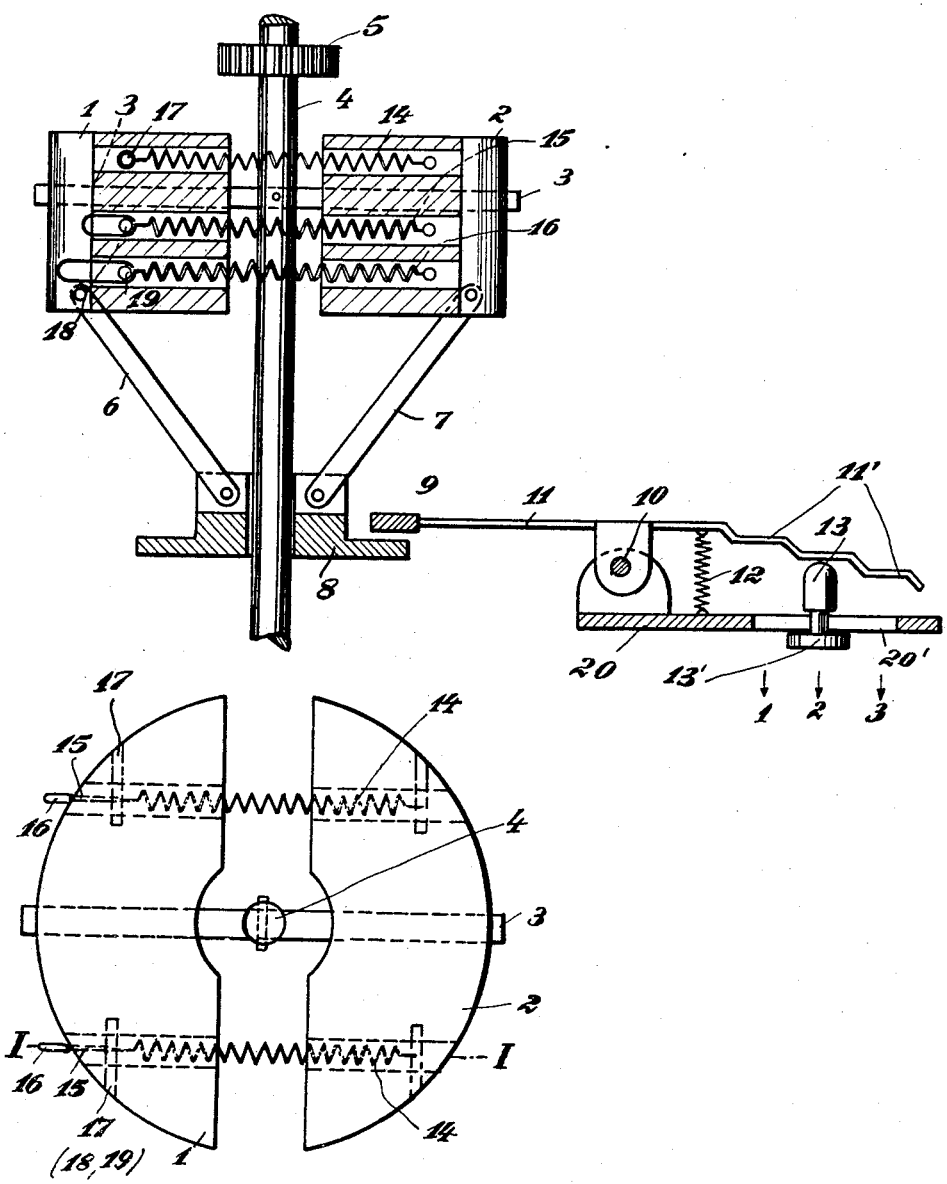

1,956,359

UNITED STATES PATENT OFFICE 1,956,359

CENTRIFUGAL GOVERNOR

Kurt Morsbach, Berlin-Grunewald, and Otto Steiner, Berlin-Spandau, Germany, assignors to Projector G. m. b. H., Berlin, Germany, a corporation of Germany Application April 1, 1931, Serial No. 527,028
In Germany April 11, 1930

11 Claims. (Cl. 188—184)

Our invention relates to centrifugal governors and relates particularly to governors to be employed in cases where several different normal speed ranges, covering a wide extent, are employed. Such conditions arise for instance in connection with motion film cameras where three different speeds are employed, viz. one speed for taking pictures at a normal rate, another speed for slow motion pictures and still another speed for fast motion pictures.

Centrifugal governors generally have rotary elements or fly-weights which are brought back to a normal position by springs. Regulation is effected by a brake disk with which a member connected with the fly-weights comes in contact under certain conditions. The tension of the springs must be such that at the particular speed to be maintained, a moderate pressure will be exerted on the brake disk. A difficulty arises from the fact that centrifugal force varies with the square of the angular velocity, while the tension of a spring varies in direct ratio to a change in its length; in view of this, at a definite spring tension, the speed can be regulated with sufficient accuracy only within a relatively small range. For instance, in the case of spring motors for talking machines, the limit of regulation is never more than fifty per cent of the average speed. In cases where several speed ranges were desired, the difficulty has been solved hitherto either by providing several separate governors, by throwing in change speed gears whenever a higher range of speed was to be obtained, or by manually substituting stronger springs for those which bring the fly-weights back to normal position.

Our present invention enables a single governor to be used for a plurality of speed ranges, without requiring any exchange or substitution of springs. According to this invention, provision is made whereby the forces opposing centrifugal force will vary discontinuously when the speed varies; in other words, the said opposing forces will not vary with a gradual change, but their variation will include sudden or jerky changes. Those points at which there is a sudden increase or change of the opposing force are preferably in the neighborhood of the speed ranges to be regulated and the grade of the increase or change at these points is so dimensioned as to enable a satisfactory regulation of different numbers of revolutions.

A governor of this new construction may be embodied in different ways. Preferably the forces opposing centrifugal force are exerted by several springs coming into operation successively, the individual spring tensions being added to one another whenever an additional spring comes into action. It is desirable to arrange the springs within the fly-weights, for instance, if coiled helical springs are employed, they may be provided with attaching eyes of different length some of which are adapted to slide on stop pins carried by said fly-weights. Thus, at a certain moment, the stop pin will engage the end of the spring eye and from that moment on the particular spring will be placed under tension. It is also desirable that the several springs should be of different normal tension or strength, corresponding to the different speed rates to be obtained.

A typical and satisfactory embodiment of our invention is illustrated by the accompanying drawing in which Fig. 1 is a side elevation of a governor with parts in section according to line I—I of Fig. 2 and Fig. 2 is a top view of the fly-weights of the governor.

The centrifugal governor illustrated comprises two fly-weights 1, 2 intended to slide on a guide rod or bar 3 which is rigidly secured to a shaft 4 and extends transversely thereof. The shaft 4 may be rotated in any suitable manner as by means of a pinion 5. Links 6, 7 are connected pivotally at one end with the fly-weights 1, 2 and at the other end with a brake disk 8 slidable lengthwise of the shaft 4 in a manner well known in connection with centrifugal governors. The brake disk 8 is adapted to engage a brake shoe 9 consisting of leather, felt or other suitable material and carried by one end of a lever 11 fulcrumed at 10. The other end of the lever 11 is provided with a series of steps 11' and is drawn by a spring 12 against a pin 13 which is slidable for adjustment lengthwise of the lever 11, being for instance mounted to move in a slot 20' of a stationary part 20, for instance a wall of the housing. The pin 13 is provided with a head or knob 13' by which it may be manipulated to slide into any one of the positions indicated by 1, 2, 3, it being understood that in each of these positions the pin 13 engages a different step 11'.

Springs 14, 15, 16 connect the two fly-weights 1, 2 and tend to move them toward each other. The spring 14 which generally is weaker than the others is connected at its left hand end with a pin 17 on the fly-weight 1, preferably in such a manner that even in the position of rest, the spring 14 will have a slight tension. The right hand ends of the springs 14, 15, 16 are connected positively with corresponding pins on the fly-weight 2. The other ends of the springs 15 and 16 are made with elongated eyes of different length fitted upon pins 18 and 19 respectively carried by the fly-weight 1. These elongated eyes extend in longitudinal direction of the springs and it will therefore be understood that when the fly-weights 1, 2 move outwardly under the influence of centrifugal force, this will at first put the spring 14 under increased tension, but will have no action on the spring 15 until a higher speed is reached at which the pin 18 engages the left hand end of the eye of the spring 15. At this moment, the spring action opposing centrifugal force will receive a sudden increase. A still greater increase of speed will bring the spring 16 into action by the engagement of the pin 19 with the left hand end of the eye of said spring. Preferably the springs are graduated in strength, as indicated in the drawing by showing them of different thickness.

If the device is to be used as a governor to maintain the lowest of the speed ranges, the pin 13 is moved in the guide slot 20' to position 3, at the extreme right. The lever 11 will thereby be swung to a position where the brake shoe 9 permits only a small outward movement of the fly-weights 1, 2, such small movement bringing the brake disk 8 into engagement with the brake shoe 9. With the parts in this position, only the spring 14 will come into action. If it is desired to have the regulation effected within the next higher speed range, the pin 13 is moved toward the left, to the central position 2 indicated in the drawing. This moves the brake shoe 9 farther away from the brake disk 8, thus releasing the latter and permitting the weights 1, 2 to fly farther apart as the speed is increased owing to the removal of the brake resistance. Such increased speed after a while brings the brake disk 8 into renewed contact with the brake shoe 9, but before this limit position is reached, the stop pin 18 has come into engagement with the left hand end of the elongated eye of the spring 15 and has put this spring under tension, so that at this second or higher speed range the spring power opposing the outward movement of the fly-weights is increased. For regulation at the third and highest speed range, the pin 13 is moved farther toward the left, to the position 1, which moves the brake shoe 9 still closer to the fly-weights and enables the rotary speed to be increased until the brake disk engages the brake shoe in its new position, but before reaching this braking position, the weights 1, 2 have moved apart sufficiently to bring the pin 19 into contact with the left hand end of the eye of the spring 16 so that here again the spring power opposing centrifugal force is increased suddenly.

The springs 14, 15, 16 may have their end portions located within bores or holes of the fly-weights 1, 2 and it will be understood that either only one spring of each kind is arranged or, as shown in the drawing especially in Fig. 2, preferably two springs 14 and likewise pairs of springs 15, 16, will be provided on opposite sides of the shaft 4. Enclosing the springs, or at least their main portions, in the fly-weights protects the springs and also reduces the resistance of the air to the motion of the springs as the weights are being whirled around. It will also be noted, particularly from Fig. 2, that the fly-weights 1, 2 are practically of semi-cylindrical form, and of complementary shape so that in the position of rest (when they are close together) they will form a cylindrical body. The recesses which Fig. 2 shows at the inner or diametral faces of the fly-weights are for the purpose of clearing the shaft 4 when the said weights are in their position of rest. By giving the fly-weights this particular shape, we reduce the resistance which the air opposes to their motion, and thus avoid the introduction of secondary braking forces which might disturb the proper operation of the device.

Various modifications may be made without departing from the nature of our invention as defined in the appended claims.

We claim:

1. A centrifugal governor provided with a rotating fly-weight, a plurality of springs for opposing the outward movement of said fly-weight and arranged to come into action successively as the rotary speed rises, so that the resistance to such outward movement will increase stepwise as the number of springs in action increases, a brake disk connected with said fly-weight, a brake member co-operating with said disk and means for adjusting said brake member to as many definite different normal positions as there are steps in the increase of the resistance to the outward movement of the fly-weight.

2. A centrifugal governor provided with a rotating fly-weight, means for opposing its outward movement providing a resistance which increases stepwise as the rotary speed rises, a brake disk connected with said fly-weight, a brake member co-operating with said disk and means for adjusting said brake member to as many definite different normal positions as there are steps in the increase of the resistance to the outward movement of the fly-weight.

3. A centrifugal governor provided with a rotary rod extending transversely of the governor axis, fly-weights mounted to slide on said rod on opposite sides of said axis and provided with bores transverse to said axis, a plurality of springs extending within said bores from one fly-weight to the other and arranged to come into action successively as the rotary speed rises, a member operatively connected with said weights, and a brake member co-operating with the first-mentioned member and adjustable to as many different normal positions as there are steps in the increase of the resistance to the outward movement of the fly-weights when said springs come into action successively.

4. A centrifugal governor provided with a rotary rod extending transversely of the governor axis, fly-weights mounted to slide on said rod on opposite sides of said axis and provided with bores transverse to said axis, a spring connecting said weights and having end portions enclosed within said bores, and mechanism operated by the movement of said fly-weights.

5. A centrifugal governor provided with a rotary fly-weight and a movable member operatively connected with said weight to be shifted thereby as said weight changes its position, a plurality of springs opposing the outward movement of said weight, a normally stationary member arranged to engage the first-mentioned member to exert a braking action thereon, said normally stationary member being movable for adjustment so as to alter the distance between said two members, and said normally stationary member having a plurality of steps corresponding to as many different normal positions of such member, and a regulating member adjustable to engage different steps of said normally stationary member.

6. A centrifugal governor provided with a rotating fly-weight and a plurality of springs for opposing the outward movement of said weight, said springs being arranged to come into action successively as the rotary speed rises, a plurality of said springs having a lost-motion connection with said weight, the extent of such lost motion differing for the individual springs.

7. A centrifugal governor provided with a rotating fly-weight and a plurality of springs for opposing the outward movement of said weight, said springs being arranged to come into action successively as the rotary speed rises, a plurality of said springs being connected with said weight by elongated eyes of different lengths to permit lost motion of different extent for each of such springs.

8. A centrifugal governor provided with a shaft, a transverse rod rotatable in unison with said shaft, fly-weights mounted to slide on said rod on opposite sides of said shaft and shaped to form, in their position of rest, a cylindrical body surrounding said shaft, and mechanism operated by the movement of said fly-weights.

9. A centrifugal governor provided with a rotary rod extending transversely of the governor axis, fly-weights mounted to slide on said rod on opposite sides of said axis and provided with bores transverse to said axis located symmetrically to said axis on opposite sides thereof, a plurality of springs extending within said bores from one fly-weight to the other and arranged to come into action successively as the rotary speed rises, a member operatively connected with said weights, and a brake member co-operating with the first-mentioned member and adjustable to as many different normal positions as there are steps in the increase of the resistance to the outward movement of the fly-weights when said springs come into action successively.

10. A centrifugal governor comprising a governor shaft, a transverse rod rotatable in unison with said shaft, a fly-weight mounted to slide on said rod, a plurality of springs for opposing the outward movement of said fly-weight, said springs being arranged to come into action successively as the rotary speed increases, a brake disk slidable lengthwise on said shaft, a connecting member pivotally connected at one end with said fly-weight and at the other end with said brake disk, and a brake member co-operating with said brake disk and adjustable in a direction lengthwise of said shaft.

11. A centrifugal governor comprising a governor shaft, a transverse rod extending to opposite sides of said shaft and rotatable in unison therewith, fly-weights mounted to slide on the said rod on opposite sides of the shaft, a plurality of springs extending substantially parallel to said rod from the fly-weight on one side of the shaft to the fly-weight on the opposite side of the shaft, for opposing the outward movement of said fly-weights, said springs being arranged to come into action successively as the rotary speed increases, a brake disk slidable lengthwise on said shaft, two connecting members, each pivotally connected at one end with said brake disk, the other ends of said members being pivotally connected with the respective fly-weights, and a brake member co-operating with said brake disk and adjustable in a direction lengthwise of said shaft.

KURT MORSBACH.
OTTO STEINER.